(12) United States Patent
Sun et al.

(10) Patent No.: US 9,505,161 B2
(45) Date of Patent: Nov. 29, 2016

(54) SOLID-STATE STRETCHED HDPE

(71) Applicant: FINA TECHNOLOGY, INC., Houston, TX (US)

(72) Inventors: Luyi Sun, Pearland, TX (US); Michael McLeod, Kemah, TX (US); John Ashbaugh, Houston, TX (US); Fengkui Li, Houston, TX (US); Leland Daniels, Dayton, TX (US)

(73) Assignee: FINA TECHNOLOGY, INC., Houston, TX (US)

( * ) Notice: Subject to any disclaimer, the term of this patent is extended or adjusted under 35 U.S.C. 154(b) by 0 days.

(21) Appl. No.: 14/250,002

(22) Filed: Apr. 10, 2014

(65) Prior Publication Data
US 2015/0290862 A1   Oct. 15, 2015

(51) Int. Cl.
| | | |
|---|---|---|
| *C08F 10/02* | (2006.01) | |
| *B29C 49/06* | (2006.01) | |
| *B29C 49/00* | (2006.01) | |
| *B29K 23/00* | (2006.01) | |
| *B29L 31/00* | (2006.01) | |

(52) U.S. Cl.
CPC ............. *B29C 49/06* (2013.01); *C08F 10/02* (2013.01); *B29C 49/0005* (2013.01); *B29K 2023/065* (2013.01); *B29K 2995/0063* (2013.01); *B29K 2995/0088* (2013.01); *B29L 2031/712* (2013.01); *C08L 2203/10* (2013.01)

(58) Field of Classification Search
CPC .. C08F 10/02; C08F 110/02; C08F 2500/07; C08F 2500/05; C08F 2500/17; C08F 2500/12; C08L 23/04; C08L 2207/062; C08L 2203/10
USPC ....................................................... 525/352
See application file for complete search history.

(56) References Cited

U.S. PATENT DOCUMENTS

| | | | |
|---|---|---|---|
| 6,300,415 B1 | 10/2001 | Okayama et al. | |
| 6,362,270 B1 | 3/2002 | Chaudhary et al. | |
| 6,632,896 B1 * | 10/2003 | Almquist | C08F 10/02 526/105 |
| 6,914,113 B2 * | 7/2005 | McLeod et al. | 526/352 |
| 7,951,881 B2 * | 5/2011 | Sukhadia et al. | 526/104 |
| 8,026,305 B2 * | 9/2011 | McLeod | C08K 5/0083 524/388 |
| 8,580,893 B2 * | 11/2013 | McLeod | C08L 23/06 524/515 |
| 8,642,701 B2 | 2/2014 | Li et al. | |
| 8,828,529 B2 * | 9/2014 | St. Jean et al. | 428/220 |
| 9,169,337 B2 * | 10/2015 | Rohatgi | C08F 10/14 |
| 9,273,170 B2 * | 3/2016 | Hlavinka | C08L 23/0815 |
| 2009/0035546 A1 * | 2/2009 | McLeod | C08J 5/18 428/219 |
| 2010/0080944 A1 * | 4/2010 | Etesse | 428/36.92 |
| 2010/0159173 A1 * | 6/2010 | Ashbaugh | C08K 5/0083 428/36.9 |
| 2011/0174413 A1 | 7/2011 | Ashbaugh et al. | |
| 2013/0059100 A1 * | 3/2013 | Hlavinka et al. | 428/35.7 |

FOREIGN PATENT DOCUMENTS

JP    2000-086722    *    3/2000    ............ C08F 10/02

OTHER PUBLICATIONS

International Search Report and Written Opinion issued in PCT/US2015/025191, dated Jul. 7, 2015, 10 pages.

* cited by examiner

*Primary Examiner* — Rip A Lee
(74) *Attorney, Agent, or Firm* — Albert Shung

(57) ABSTRACT

An ISBM article is disclosed wherein the ISBM article is made from an HDPE resin having a MI2 of 0.1 to 5.0 dg/min as measured by ASTM D-1238; 190° C./2.16 kg, a density of from 0.940 to 0.970 g/cc as measured by ASTM D792, a peak molecular weight of greater than 40,000 g/mol and a zero shear viscosity between 15,000 and 250,000 Pa·sec.

26 Claims, 1 Drawing Sheet

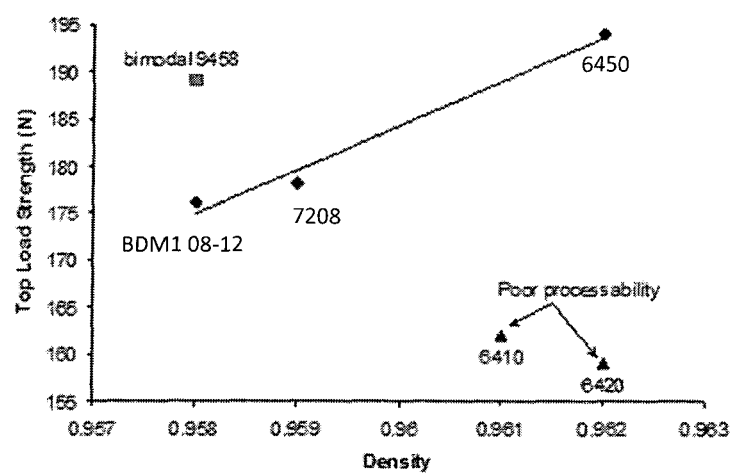

SOLID-STATE STRETCHED HDPE

FIELD

Embodiments of the present invention generally relate to polymers adapted for use in injection stretch blow molding. In particular, embodiments of the invention relate to ethylene polymers adapted for use in injection stretch blow molding.

BACKGROUND

Several polymer processing techniques use solid-state stretching in creating final products. Non-limiting examples include thermoforming, drawn tape, drawn monofilament, machine direction oriented (MDO) film, biaxially oriented film (such as through double bubble processing and tenter frame stretching), solid-state extrusion and injection stretch blow molding. Traditionally, these processes deform a starting article at a temperature below its melting temperature, shaping it into a final desired shape.

Injection stretch blow molding (ISBM) is a subset of solid-state stretching. ISBM may eliminate flash trimming and the regrind that is reused in conventional extrusion blow molding (EBM). ISBM often produces more precise bottle threads because those are formed through the injection molding step. The solid-state stretching step may produce a stiff bottle with exceptional top-load properties and other improved physical properties, which may allow downgauging/lightweighting. In addition, surface smoothness may be improved by articles made by ISBM, thereby improving printability and print quality. Further, a smooth surface provides proper label adhesion in molded articles such as bottles. Because ISBM bottles are stretched in the solid-state, the need for melt strength may be reduced or eliminated. A resin not well suited for conventional EBM may be well suited for ISBM.

ISBM commercial lines can produce thousands of bottles in an hour. To realize such rates, resins typically used for ISBM have excellent processability. Other resin characteristics may include ready stretchability and few failures during the stretching and blowing step.

SUMMARY

In one embodiment of the present disclosure, an ISBM article is disclosed wherein the ISBM article is made from an HDPE resin having a MI2 of 0.1 to 5.0 dg/min as measured by ASTM D-1238; 190° C./2.16 kg, a density of from 0.940 to 0.970 g/cc as measured by ASTM D792, a peak molecular weight of greater than 40,000 g/mol and a zero shear viscosity between 15,000 and 250,000 Pa·sec.

In another embodiment of the present disclosure, an ISBM article is disclosed wherein the ISBM article is made from an HDPE resin having MI2 of 0.5 to 8.0 dg/min as measured by ASTM D-1238; 190° C./2.16 kg, a polydispersity of from 2.0 to 7.0, and a zero shear viscosity between 1000 to 50,000 Pa·sec. The article has a 45° gloss of greater than or equal to 50 as measured by ASTM D523 and a haze of less than or equal to 25% as measured by ASTM 1003.

In yet another embodiment of the present disclosure, a method of forming an injection stretch blow molded article is disclosed. The method includes providing a an HDPE resin having a MI2 of 0.1 to 5.0 dg/min as measured by ASTM D-1238; 190° C./2.16 kg, density of from 0.940 to 0.970 g/cc as measured by ASTM D792, a peak molecular weight of less than 50,000 g/mol as measured by GPC and a zero shear viscosity between 1000 to 250,000 Pa·sec. The method further includes injection molding the HDPE resin into a preform and stretch-blowing the preform into an article. The method has a failure rate of less than 2%.

BRIEF DESCRIPTION OF DRAWINGS

The FIGURE illustrates top load strength versus density of polyethylene ISBM bottles as described in the Example.

DETAILED DESCRIPTION

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

In certain embodiments of the present disclosure, polymers suitable for ISBM are disclosed. In one or more embodiments, such as when a low failure rate and high top load strength are desired, a high density polyethylene (HDPE) with certain characteristics may be used. The HDPE for these embodiments may have an MI2 of 0.1 to 5.0 dg/min, alternatively from 0.2 to 2.0 dg/min or from 0.4 to 0.7 dg/min as measured by ASTM D-1238; 190° C./2.16 kg. The density of the HDPE for these embodiments may be from 0.940 to 0.970 g/cc, 0.950 to 0.962 g/cc or 0.958 to 0.959 g/cc as measured by ASTM D792. The peak molecular weight (Mp) may be greater than 40,000 g/mol, or greater than 50,000 g/mol as measured by GPC. The weight average molecular weight (Mw) may be between 100,000 and 200,000 or between 130,000 and 170,000, as measured by GPC. In certain embodiments, the polydispersity (Mw/Mn) may be between 5 and 15 or between 8 and 14. The zero shear viscosity may be between 15,000 and 250,000 Pa·sec, from 30,000 to 250,000 Pa·sec, or from 35,000 to 70,000 Pa·sec. The relaxation time (seconds) may be between 0.0010 and 0.010 or between 0.015 and 0.060. Failure rate of objects made via ISBM from such resins may be less than ≤2%. Examples for such resins include, but are not limited to Total 7208, 9458 and BDM1 08-12. In certain embodiments, the method has a failure rate of 10% or less.

In certain embodiments, the HDPE resin has a density of from 0.953 to 0.959 g/cc as measured by ASTM D792.

In certain other embodiments, such as where objects produced by ISBM with superior optical properties are desired, the HDPE may have an MI2 of 0.5 to 8.0 dg/min, 1.0 to 5.0 dg/min, or 1.5 to 3.0 dg/min as measured by ASTM D-1238; 190° C./2.16 kg. The polydispersity (Mw/Mn) of the HDPE may be from 2.0 to 7.0, 2.5 to 6.5, or from 3.0 to a 6.0.

In certain embodiments, the HDPE resin has an MI2 of from 0.25 to 1.0 dg/min, as measured by ASTM D-1238; 190° C./2.16 kg.

Rheological breadth is a function of the relaxation time distribution of the resin, which in turn is a function of a resin's molecular architecture. The breadth parameter is experimentally determined assuming Cox-Merz rule by fitting flow curves generated using linear-viscoelastic dynamic oscillatory frequency sweep experiments with a modified Carreau-Yasuda (CY) model, $$\eta = \eta_B[1+(\lambda\gamma)\alpha]^{(n-1/\alpha)}$$

where:
$\eta$=viscosity (Pa s);
$\gamma$=shear rate (1/s);
$\alpha$=rheological breadth parameter [CY model parameter which describes the breadth of the transition region between Newtonian and power law behavior];
$\lambda$=relaxation time sec [CY model parameter which describes the location in time of the transition region];

$\eta_B$=Zero shear viscosity (Pa s) [CY model parameter which defines the Newtonian plateau]; and
n=power law constant [CY model parameter which defines the final slope of the high shear rate region].

To facilitate model fitting, the power law constant (n) is held to a constant value (n=0). Experiments were carried out using a parallel plate geometry and strains within the linear viscoelastic regime over a frequency range of 0.1 to 316.2 sec (−1). Frequency sweeps were performed at three temperatures (170° C., 200° C., and 230° C.) and the data was shifted to form a master curve at 190° C. using known time-temperature superposition methods. The zero shear viscosity of HPDE resins may be between 1000 to 50,000 Pa·sec, 2000 to 25,000 Pa·sec, or 2500 to 12,500 Pa·sec.

Articles made from such resins may have a 45° gloss of greater than or equal to 50 or greater than 60 as measured by ASTM D523 and a haze of less than or equal to 25% or less than 15% as measured by ASTM 1003. Examples for such resins include, but are not limited to, Total 6410, 6420 and 6450.

Product Application

In one embodiment, the polymers are used in injection stretch blow molding (ISBM). ISBM may be used to produce thin-walled, high-clarity bottles. Such processes are generally known to one skilled in the art. For example, ISBM processes may include injecting the polymer into a preform and subsequently stretch-blowing the preform into a bottle.

EXAMPLE

Several polyethylene resins were compared in their performance in ISBM processing. The HDPE resins were all Total Petrochemical products and all were produced on commercial reactors. Details regarding the resins are presented in Table 1.

TABLE 1

|  | 2285 | 5502 | 6410 | 6420 | 6450 | 7208 | 9458 | BDM1 08-12 |
|---|---|---|---|---|---|---|---|---|
| Molecular Weight | | | | | | | | |
| Mn (g/mol) | 12465 | 17280 | 21586 | 19499 | 15676 | 19880 | 12220 | 11443 |
| Mw (g/mol) | 248318 | 122938 | 116368 | 106197 | 83193 | 168782 | 160817 | 134377 |
| Mz (g/mol) | 1497771 | 938573 | 530298 | 498305 | 405893 | 1420493 | 967673 | 772083 |
| Mp (g/mol) | 22573.2 | 35727 | 61291 | 56170 | 44054 | 65948 | 59958 | 59231 |
| D = Mw/Mn | 19.93 | 7.12 | 5.41 | 5.48 | 5.31 | 8.54 | 13.14 | 11.74 |
| D' = Mz/Mw | 6.03 | 7.57 | 4.55 | 4.68 | 4.87 | 8.16 | 5.96 | 5.74 |
| Density (g/cc) | | | | | | | | |
| Density (g/cc) | 0.951 | 0.955 | 0.961 | 0.961 | 0.962 | 0.959 | 0.958 | 0.958 |
| Melt Indices | | | | | | | | |
| MI2 (dg/min) | 0.08 | 0.35 | 1.2 | 2 | 5 | 0.5 | 0.45 | 0.64 |
| MI5 (dg/min) | 32 | — | — | — | — | 1.75 | 1.8 | 2.55 |
| HLMI (dg/min) | 11 | 30 | 33 | 55 | — | 22 | 36.5 | 47 |
| SR2 (HLMI/MI2) | 137.5 | 85.7 | 27.5 | 27.5 | — | 44.0 | 81.1 | 73.4 |
| Rheology: Carreau Yasuda Parameters | | | | | | | | |
| Zero Shear Visc. (Pa · sec) | 457846 | 6470000 | 10977 | 6214 | 2668 | 62674 | 66455 | 36649 |
| Relax. Time (sec.) | 0.390 | 0.123 | 0.007 | 0.005 | 0.002 | 0.019 | 0.057 | 0.037 |
| Rheo. Breadth | 0.225 | 0.099 | 0.337 | 0.352 | 0.368 | 0.216 | 0.241 | 0.260 |
| Power Law Index | 0.0 | 0.0 | 0.0 | 0.0 | 0.0 | 0.0 | 0.0 | 0.0 |
| Activation Energy to Flow (kJ/mol) | 31.86 | 29.79 | 27.15 | 26.39 | 26.37 | 25.59 | 27.23 | 26.93 |

Molecular Weight in Table 1 was measured by GPC; Density was measured by D792. MI2 MI5, and HLMI were measured by ASTM D-1238; 190° C./2.16 kg. HLMI is defined as high load melt index.

Processability of the resins listed in table 1 was ranked according to the following scale:

Ranking=1. Only <20% of preforms successfully formed a bottle.

Ranking=2. Between ≥20% to <90% of preforms successfully formed a bottle.

Ranking=3. Between ≥90% to <98% of preforms successfully formed a bottle.

Ranking=4. ≥98% of preforms successfully formed a bottle.

Based on this ranking system, the HDPEs rated as follows:

1=2285, 5502

2=6410, 6420, 6450

4=7208, 9458, BDM1 08-12

Different samples of HDPE had clear differences in stretching performance. Total 7208, 9458 and BDM1 08-12 had superior stretching performance in comparison to Total 6410, 6420, 6450, 2285 and 5502.

The top load strengths of the bottles were tabulated, with load measured in Newtons:
6410: 162±14 Newtons
6420: 159±14 Newtons
6450: 194 Newtons (only one bottle tested)
7208: 178±4 Newtons
9458: 189±7 Newtons
BDM1 08-12: 176±6 Newtons Top load strength provides information about the crushing properties of an ISBM end-use article when employed under crush test conditions. Tests of the top load strength were carried out by placing the ISBM article on a lower plate (vertically) and slowly raising it against an upper plate to measure the corresponding load capacity of the ISBM articles.

Bottles made from Total 7208, 9458, and BDM 08-12 bottles had higher top load strengths than Total 6410 and 6420, although Total 6410 and 6420 are more dense. In addition, bimodal resin Total 9458 bottles exhibit higher top load strength than unimodal grades with same density. Thus, bimodal grade PE increases processability and bottle top load strength. The FIGURE compares top load strength versus density for each of the samples tested.

Bottles made from Total 6410 and 6420, and 6450 bottles have superior optical properties of the HDPE resins tested. Total 6420 in particular has exceptional haze and gloss over Total 7208, 9458 or BDM1 08-12.

TABLE 2

Haze and gloss values for ISBM bottles.

| Material | Haze (%) | Gloss (45°) |
| --- | --- | --- |
| 6410 | 42.0 ± 1.2 | 50.2 ± 5.0 |
| 6420 | 13.1 ± 1.7 | 65.9 ± 2.8 |
| 6450 | 19.6 ± 12.1 | 50.0 ± 4.8 |
| 7208 | 38.2 ± 3.4 | 36.7 ± 5.0 |
| 9458 | 47.4 ± 2.1 | 31.4 ± 3.6 |
| BDM1 08-12 | 26.9 ± 3.6 | 43.2 ± 4.8 |

While the foregoing is directed to embodiments of the present disclosure, other and further embodiments may be devised without departing from the basic scope thereof and the scope thereof is determined by the claims that follow.

What is claimed is:

1. An injection stretch blow molded (ISBM) bottle comprising:
an HDPE resin having a MI2 of 0.1 to 5.0 dg/min as measured by ASTM D-1238; 190° C./2.16 kg, density of from 0.940 to 0.959 g/cc as measured by ASTM D792, a peak molecular weight of greater than 40,000 g/mol and a zero shear viscosity between 15,000 and 250,000 Pa·sec, wherein said HDPE resin is bimodal, and wherein said HDPE resin is the only HDPE resin of the ISBM bottle.

2. The bottle of claim 1, wherein said HDPE resin has an MI2 of from 0.25 to 1.0 dg/min, as measured by ASTM D-1238; 190° C./2.16 kg.

3. The bottle of claim 1, wherein said HDPE resin has a peak molecular weight of greater than 50,000 g/mol.

4. The bottle of claim 1, wherein said HDPE resin has a zero shear viscosity between 35,000 to 70,000 Pa·sec.

5. The bottle of claim 1, wherein the MI2 of said HDPE resin is between 0.4 and 0.7 dg/min as measured by ASTM D-1238.

6. The bottle of claim 1, wherein the Mw of said HDPE resin is between 130,000 and 170,000.

7. The bottle of claim 1, wherein the density of said HDPE resin is between 0.958 and 0.959 g/cc as measured by ASTM D792.

8. The bottle of claim 1, wherein the relaxation time of said HDPE resin is between 0.015 and 0.060 seconds.

9. The bottle of claim 1, wherein said HDPE resin has a polydispersity ranging from 5 to 15, a weight average molecular weight ranging from 100,000 to 200,000, and a relaxation time of from 0.015 to 0.060 seconds.

10. An injection stretch blow molded (ISBM) bottle comprising:
an HDPE resin having MI2 of 0.5 to 8.0 dg/min as measured by ASTM D-1238; 190° C./2.16 kg, a polydispersity (Mw/Mn) of from 3.0 to 6.0, and a zero shear viscosity between 2,500 to 12,500 Pa·sec; wherein said ISBM bottle has a 45° gloss of greater than or equal to 50 as measured by ASTM D523 and a haze of less than or equal to 25% as measured by ASTM 1003, and wherein said HDPE resin is the only HDPE resin of the ISBM bottle.

11. The bottle of claim 10, wherein said HDPE resin has an MI2 of 1.5 to 3.0 dg/min as measured by ASTM D-1238; 190° C./2.16 kg.

12. The bottle of claim 10, wherein said HDPE resin is unimodal.

13. The bottle of claim 10, wherein said ISBM bottle has a 45° gloss of greater than 60 as measured by ASTM D523.

14. The bottle of claim 10, wherein said ISBM bottle has a haze of less than 15% as measured by ASTM 1003.

15. An injection stretch blow molded (ISBM) bottle comprising:
an HDPE resin having a MI2 of 0.4 to 0.7 dg/min as measured by ASTM D-1238; 190° C./2.16 kg, a density of from 0.958 to 0.959 g/cc as measured by ASTM D792, a peak molecular weight of greater than 40,000 g/mol and a relaxation time of between 0.015 and 0.060 seconds, wherein said HDPE resin is bimodal or unimodal, and wherein said HDPE resin is the only HDPE resin of the ISBM bottle.

16. The article of claim 15, wherein said HDPE resin is bimodal.

17. A method of forming an injection stretch blow molded bottle comprising:
providing an HDPE resin having a MI2 of 0.1 to 5.0 dg/min as measured by ASTM D-1238; 190° C./2.16 kg, density of from 0.940 to 0.959 g/cc as measured by ASTM D792, a peak molecular weight of greater than 40,000 g/mol and a zero shear viscosity between 15,000 to 250,000 Pa·sec, wherein said HDPE resin is bimodal;
injection molding said HDPE resin into a preform; and
stretch-blowing said preform into a bottle, wherein said HDPE resin is the only HDPE resin of the ISBM bottle, wherein said method has a failure rate of 10% or less.

18. The method of claim 17, wherein said method has a failure rate of less than 2%.

19. The method of claim 17, wherein said HDPE resin has a polydispersity ranging from 5 to 15, a weight average molecular weight ranging from 100,000 to 200,000, a relaxation time of from 0.015 to 0.060 seconds, and wherein said method has a failure rate of less than 2%.

20. A method of forming an injection stretch blow molded bottle comprising:
providing an HDPE resin having MI2 of 0.5 to 8.0 dg/min as measured by ASTM D-1238; 190° C./2.16 kg, a polydispersity (Mw/Mn) of from 3.0 to 6.0, and a zero shear viscosity between 2,500 to 12,500 Pa·sec;

injection molding said HDPE resin into a preform; and stretch-blowing said preform into a bottle, wherein said bottle has a 45° gloss of greater than or equal to 50 as measured by ASTM D523 and a haze of less than or equal to 25% as measured by ASTM 1003, and wherein said HDPE resin is the only HDPE resin of the bottle.

21. The method of claim 20, wherein said HDPE resin is unimodal.

22. A method of forming an injection stretch blow molded bottle comprising:

providing a high density polyethylene resin having a MI2 of 0.1 to 5.0 dg/min as measured by ASTM D-1238 at a temperature of 190° C. and a load of 2.16 kg; a density of from 0.940 to 0.970 g/cc as measured by ASTM D792; a peak molecular weight of greater than 40,000 g/mol; and a zero shear viscosity between 15,000 and 250,000 Pa·sec;

injection molding the high density polyethylene resin into a preform; and stretch-blowing the preform into the injection stretch blow molded bottle, wherein the method has a failure rate of less than 10%.

23. The method of claim 22, wherein the method has a failure rate of less than 2%.

24. A method of forming an injection stretch blow molded bottle comprising:

providing a high density polyethylene resin having MI2 of 0.5 to 8.0 dg/min as measured by ASTM D-1238 at a temperature of 190° C. and a load of 2.16 kg; a polydispersity (Mw/Mn) of from 2.0 to 7.0; and a zero shear viscosity between 1000 to 50,000 Pa·sec;

injection molding the high density polyethylene resin into a preform; and stretch-blowing the preform into the injection stretch blow molded bottle, wherein the injection stretch blow molded bottle has a 45° gloss of greater than or equal to 50 as measured by ASTM D523 and a haze of less than or equal to 25% as measured by ASTM 1003.

25. The method of claim 24, wherein the injection stretch blow molded bottle has a 45° gloss of greater than 60 as measured by ASTM D523.

26. The method of claim 24, wherein the injection stretch blow molded bottle has a haze of less than 15% as measured by ASTM 1003.

* * * * *